United States Patent
Song et al.

(10) Patent No.: US 7,814,468 B1
(45) Date of Patent: Oct. 12, 2010

(54) METHOD FOR LOOP REFORMULATION

(75) Inventors: Yonghong Song, South San Francisco, CA (US); Xiangyun Kong, Union City, CA (US)

(73) Assignee: Oracle America, Inc., Redwood City, CA (US)

( * ) Notice: Subject to any disclaimer, the term of this patent is extended or adjusted under 35 U.S.C. 154(b) by 1340 days.

(21) Appl. No.: 11/111,167

(22) Filed: Apr. 20, 2005

(51) Int. Cl.
*G06F 9/45* (2006.01)

(52) U.S. Cl. ................ 717/160; 717/136; 717/140; 717/141; 717/150; 717/151; 717/159

(58) Field of Classification Search ............. 717/159, 717/160
See application file for complete search history.

(56) References Cited

U.S. PATENT DOCUMENTS

| | | | | |
|---|---|---|---|---|
| 5,797,013 A | * | 8/1998 | Mahadevan et al. | 717/160 |
| 5,930,510 A | * | 7/1999 | Beylin et al. | 717/161 |
| 6,230,317 B1 | * | 5/2001 | Wu | 717/161 |
| 6,301,706 B1 | * | 10/2001 | Maslennikov et al. | 717/160 |
| 6,539,541 B1 | * | 3/2003 | Geva | 717/150 |
| 6,571,385 B1 | * | 5/2003 | Muthukumar et al. | 717/150 |
| 6,611,956 B1 | * | 8/2003 | Ogawa et al. | 717/152 |
| 7,412,684 B2 | * | 8/2008 | Gutberlet et al. | 716/18 |
| 2004/0003386 A1 | * | 1/2004 | Tal et al. | 717/160 |
| 2004/0083459 A1 | * | 4/2004 | Roediger et al. | 717/130 |
| 2005/0028135 A1 | * | 2/2005 | Burnette et al. | 717/106 |
| 2005/0240896 A1 | * | 10/2005 | Wu et al. | 717/100 |

* cited by examiner

*Primary Examiner*—Insun Kang
(74) *Attorney, Agent, or Firm*—Martine Penilla & Gencarella, LLP

(57) ABSTRACT

A method for loop reformulation is provided such that a single exit ill-formed loop (SEIFL) can be reformulated into a reformulated code block that contains a transformed well-formed loop (TWFL). A SEIFL loop is a loop that can exit from the loop body of the loop. After the loop reformulation, the TWFL of the reformulated code block can only exit from the end of the loop. The reformulated code block will replace the SEIFL in the compiler's internal representation (IR) such that a more efficient executable machine code can be generated by optimizing the reformulated compiler's IR.

16 Claims, 3 Drawing Sheets

METHOD FOR LOOP REFORMULATION

BACKGROUND

1. Field of the Invention

The present invention relates generally to loop optimization for a computer program, and more particularly, to a method for reformulating a single exit ill-formed loop (SEIFL) such that the SEIFL is transformed into a reformulated code block that contains a transformed well-formed loop (TWFL).

2. Description of the Related Art

In order to run a computer program in a computer system, the source code of the computer program needs to be transformed into the corresponding executable machine code. The transformation from the program source code to the corresponding machine code of a computer program typically involves a computer program compiler.

When presented with a program source code, the compiler of a computer system parses the program source code, performs semantic analysis (including the generation of error messages), and produces the compiler's internal representation (IR). The compiler's IR can be optimized by the compiler and then processed by a code generator of the compiler to generate the corresponding program machine code.

The program source code often includes many loops, which typically consumes most of the execution time. Therefore, loop optimization plays a very important role in enhancing the performance of a computer system. After the program source code is processed into the compiler's IR, a loop (in the form of the compiler's IR) starts with a loop header and ends with a loop end. The code statements located between the loop header and the loop end form the loop body.

A loop of the compiler's IR can be either a well-formed loop or an ill-formed loop, depending upon the original source code of the loop. A well-formed loop does not have any loop exit statements in the loop body. However, an ill-formed loop has at least one loop exit statement in the loop body. As a result, an ill-formed loop will either exit the loop or exit the program procedure from the loop body during a program execution.

The compiler can optimize well-formed loops and generate efficient machine code, resulting in improved performance for the computer system. The compiler's optimization for a well-formed loop includes scalar optimization, loop transformation for memory locality, and automatic parallelization. However, the compiler is incapable of optimizing an ill-formed loop. As a result, inefficient machine code will be generated for a computer program with ill-formed loops, diminishing the performance of the computer system.

In view of the foregoing, there is a need for a method that can reformulate an ill-formed loop such that the ill-formed loop will be transformed into a reformulate code block that contains a transformed well-formed loop.

SUMMARY

Broadly speaking, the present invention fills this need by providing a method for reformulating a single exit ill-formed loop (SEIFL) of a compiler's internal representation (IR) into a reformulated code block that contains a transformed well-formed loop (TWFL).

In accordance with one aspect of the present invention, a method for loop reformulation is presented. First of all, a SEIFL is provided. The SEIFL includes a header, a loop body, and an end. The header defines the beginning of the SEIFL, while the end defines the ending of the SEIFL. The loop body, formed by the code statements between the header and the end, includes a loop exit statement. The loop exit statement includes a loop exit condition such that the SEIFL will exit from the loop body of the SEIFL when the loop exit condition of the loop exit statement is verified to be true. The provided SEIFL will be reformulated into a reformulated code block that contains a TWFL such that the TWFL exits from the end of the TWFL.

In accordance with another aspect of the present invention, a computer readable media having program instructions for loop reformulation is provided. The computer readable media include program instructions for detecting a SEIFL. The SEIFL includes a header, a loop body, and an end. The header defines the beginning of the SEIFL, while the end defines the ending of the SEIFL. The loop body, formed by the code statements between the header and the end, includes a loop exit statement. The loop exit statement includes a loop exit condition such that the SEIFL will exit from the loop body of the SEIFL when the loop exit condition of the loop exit statement is verified to be true. The computer readable media further includes program instructions for reformulating the SEIFL into a reformulated code block, wherein the reformulated code block includes a TWFL that exits from the end of the TWFL.

In accordance with a further aspect of the present invention, a method for computer program transformation is provided. The method initiates with providing a computer program source code. The provided program source code is processed into a compiler's IR. Then, the compiler's IR is detected to see whether any SEIFLs exist in the compiler's IR. Each of the SEIFLs is formed by a header, a loop body, and an end. The loop body of each of the SEIFLs contains a loop exit statement. Each of the SEIFLs is capable of exiting from the loop body of each of the SEIFLs. If the compiler's IR contains any SEIFLs, the method further includes reformulating each of the SEIFLs into each of the corresponding reformulated code blocks, and replacing each of the SEIFLs in the compiler's IR with each of the corresponding reformulated code blocks. Finally, the compiler's IR is generated into a program executable machine code. Each of the corresponding reformulated code blocks contains a TWFL.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

Reference is made in detail to embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details. In other instances, well-known methods, procedures, components, and circuits have not been described in detail so that aspects of the invention will not be obscured.

Figure 1:
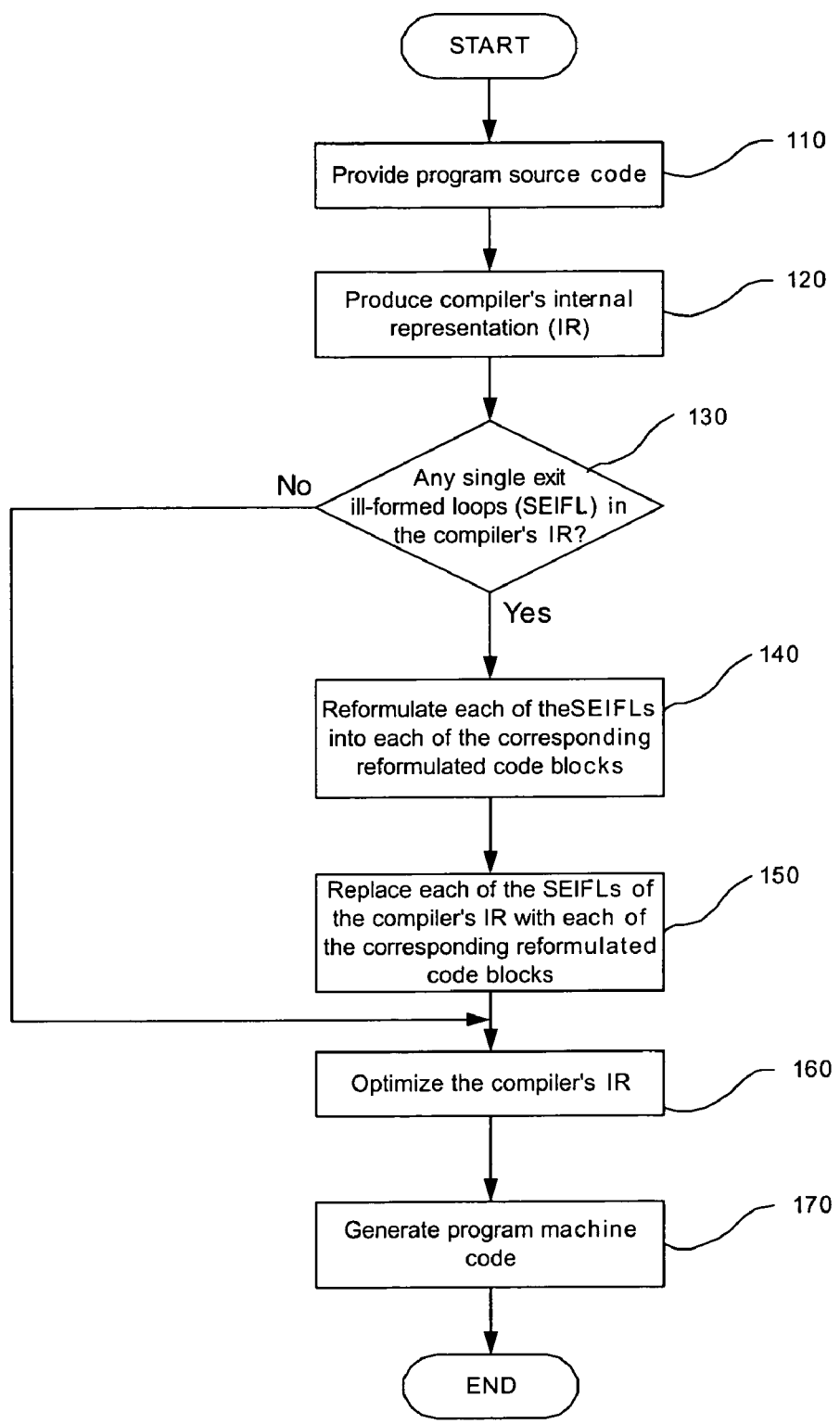
FIG. 1 is a functional flow chart illustrating an exemplary program transformation method by which the program source code is transformed into the corresponding program machine code in accordance with one embodiment of the present invention.

FIG. 1 is a functional flow chart illustrating an exemplary program transformation method by which the program source code is transformed into the corresponding program machine code in accordance with one embodiment of the present invention.

Starting at operation 110, a program source code is provided in order to be transformed into the corresponding program machine code. The program source code is processed into a compiler's internal representation (IR) in operation 120. Then, the compiler's IR will be checked in operation 130 to detect whether any single exit ill-formed loops (SEIFL) exist in the compiler's IR. If the compiler's IR contains any SEIFLs, each of the SEIFLs is reformulated into each of the corresponding reformulated code blocks in operation 140. In one embodiment, the detected SEIFLs in the compiler's IR are reformulated one by one from the beginning of each of the program procedures that contain SEIFLs. If no SEIFLs exist in the compiler's IR, the program transformation method will proceed to operation 160.

In operation 150, each of the SEIFLs of the compiler's IR is replaced with each of the reformulated code blocks. The newly formed compiler's IR will be optimized in operation 160 and then generated into the corresponding machine code in operation 170. The optimization process in operation 160 is optional for this program transformation method.

After the SEIFLs of a compiler's IR are replaced with the respectively reformulated code blocks, the reformulated code blocks of the compiler's IR can be optimized because each of the reformulated code blocks contains a transformed well-formed loop (TWFL). As a result, more efficient machine code can be generated from the compiler's IR.

For the purpose of concise description for the present invention, a SEIFL of a compiler's IR is briefed as a SEIFL. A SEIFL is formed by a header, a loop body, and an end. The code statements located between the header and the end of the SEIFL form the loop body of the SEIFL. A SEIFL needs to process the following features:

(1). A SEIFL has only one loop exit statement in the loop body;

(2). The loop exit statement of the SEIFL contains a loop exit condition that is verified in the loop exit statement of the SEIFL, and the loop exit condition contains an index variable that is used by an increment or decrement loop index computational statement in the loop body of the SEIFL.

Figure 2:
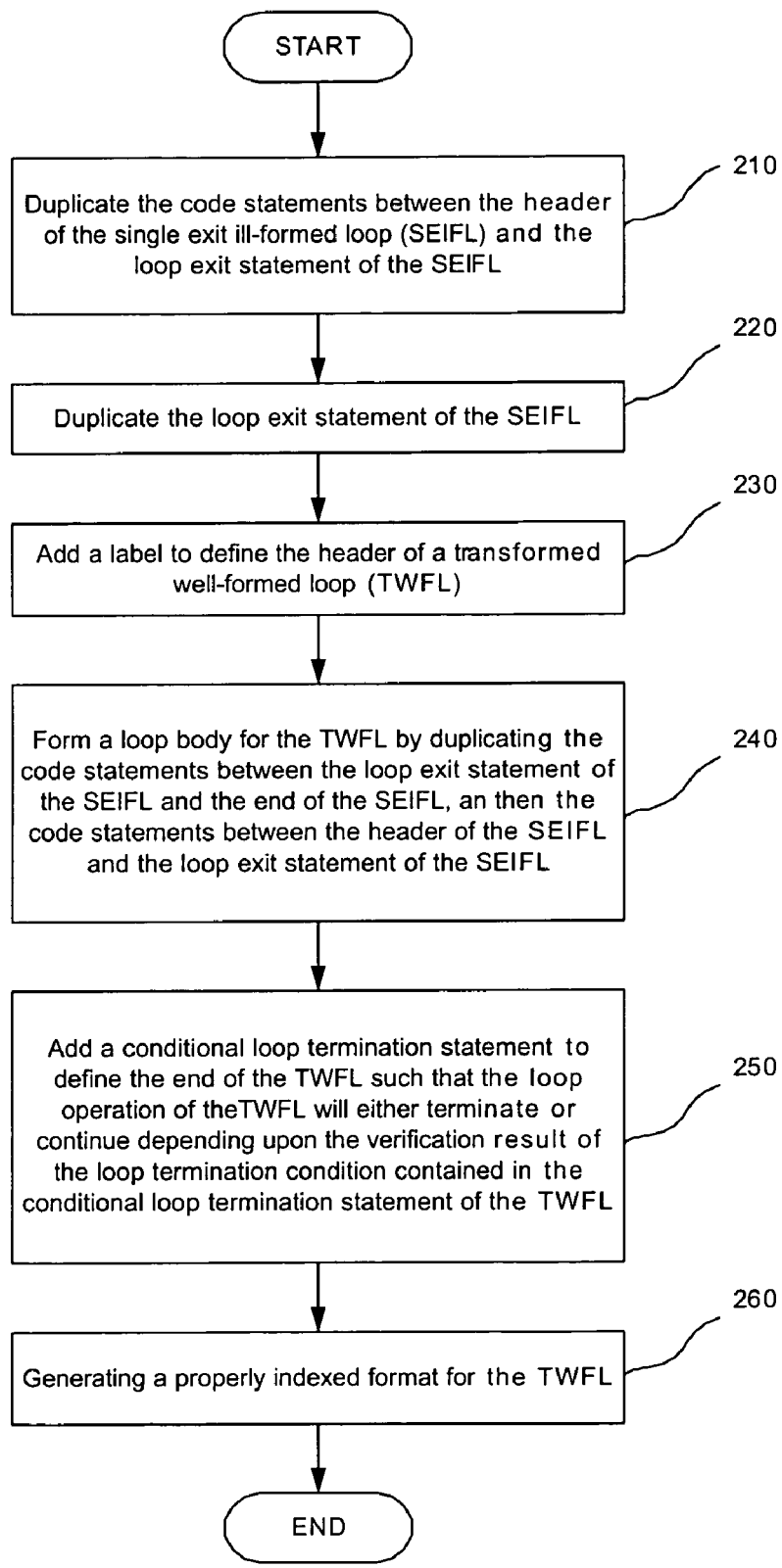
FIG. 2 is a functional flow chart showing an exemplary method for reformulating a single exit ill-formed loop into a reformulated code block that contains a transformed well-formed loop in accordance with one embodiment of the present invention.

FIG. 2 is a functional flow chart showing an exemplary method for reformulating a SEIFL into a reformulated code block that contains a TWFL in accordance with one embodiment of the present invention. Entry condition for this functional flow chart is that a SEIFL is provided, and the header, the end, and the loop exit statement of the SEIFL are identified.

The method in FIG. 2 initiates from operation 210 where the code statements between the header of the SEIFL and the loop exit statement of the SEIFL is duplicated to start the formation of the reformulated code block. The method advances to operation 220 where the loop exit statement of the SEIFL is duplicated. The method then proceeds to operation 230 to add a label that defines the header of a TWFL. The label is a mark in a computer program or a compiler's IR for the purpose of identification. In one embodiment, the label is formed by a plurality of characters. The method then moves to operation 240 where the loop body of the TWFL is formed by duplicating the code statements between the loop exit statement of the SEIFL and the end of the SEIFL, and then the code statements between the header of the SEIFL and the loop exit statement of the SEIFL.

The method in FIG. 2 then advances to operation 250 where a conditional loop termination statement is added to define the end of the TWFL. The conditional loop termination statement contains a loop termination condition such that the loop operation of the TWFL will either terminate or continue, depending upon the verification result of the loop termination condition contained in the conditional loop termination statement.

The conditional loop termination statement is formed by duplicating the loop exit statement of the SEIFL such that the loop termination condition of the conditional loop termination statement of the TWFL is identical to the loop exit condition of the loop exit statement of the SEIFL, and by adding a branch statement such that when the loop termination condition of the conditional loop termination statement of the TWFL is verified to be false, the branch statement will jump back to the label of the TWFL to continue the loop operation of the TWFL.

Finally, the method in FIG. 2 proceeds to operation 260 where a properly indexed format is generated for the TWFL of the reformulated code block. The operation 260 will be illustrated in detail in FIG. 3. The operation 260 is optional for the formation of the reformulated code block.

Figure 3:
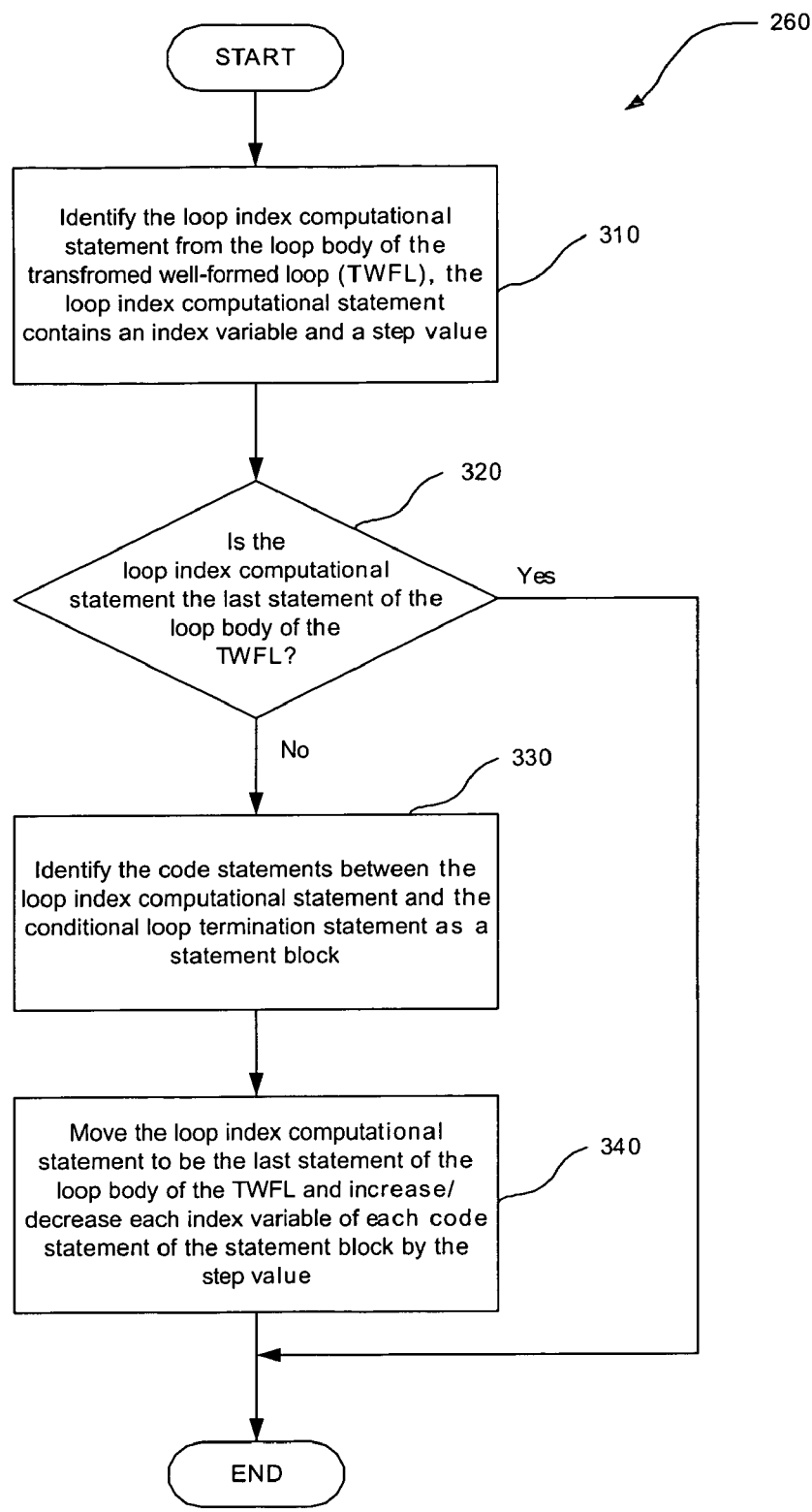
FIG. 3 is a functional flow chart showing an exemplary method for generating a properly indexed format for a transformed well-formed loop of a reformulated code block in accordance with one embodiment of the present invention.

FIG. 3 is a functional flow chart showing an exemplary method for generating a properly indexed format for a TWFL of a reformulated code block in accordance with one embodiment of the present invention. If the loop index computational statement is the last statement of the loop body of a well-formed loop, then this well-formed loop has a properly indexed format.

Starting from operation 310, a loop index computational statement is identified from the loop body of the TWFL. The loop index computational statement of the TWFL, being identical to the loop index computational statement of the SEIFL, contains an index variable and a step value. In operation 320, the identified loop index computational statement is checked to see whether it is the last statement of the loop body of the TWFL. If the loop index computational statement is the last statement of the loop body of the TWFL, the method in FIG. 3 terminates.

If the loop index computational statement is not the last statement of the loop body of the TWFL, the method in FIG. 3 proceeds to operation 330 where the code statements between the loop index computational statement and the conditional loop termination statement are identified as a statement block. In operation 340, the loop index computational statement is moved to be the last statement of the loop body of the TWFL and each index variable of each code statement of the statement block is increased/decreased by the step value of the loop index computational statement.

Table 1 provides an exemplary SEIFL that is to be reformulated into a reformulated code block illustrated in Table 2.

As shown in Table 1, the SEIFL, written in C, starts from the header "begin" and ends with the end "goto begin". The code statements located between the header and the end of the SEIFL form the loop body of the SEIFL in Table 1. The loop exit statement of the SEIFL in Table 1 is the statement of "if (i>10) goto next", while the index variable "i", contained in the loop exit condition "i>10" of the loop exit statement, is used by the increment loop index computational statement "i=i+1" in the loop body of the SEIFL in Table 1.

TABLE 1

```
i = 0;
begin:                    /* header of the SEIFL*/
  a[i] = b[i];
  i = i + 1;
  e[i] = f[i];
  if ( i >10 ) goto next; /* loop exit statement of the SEIFL*~/
  c[i] = d[i];
  goto begin;             /* end of the SEIFL*/
next:
```

The SEIFL in Table 1 can be reformulated into a reformulated code block shown in Table 2. The reformulated code block in Table 2 starts with a statement of "a[i]=b[i]" and ends with a conditional loop termination statement of "if (i>10) goto next else goto start".

The TWFL contained in the reformulated code block in Table 2 begins with the label "start" and ends with the conditional loop termination statement of "if (i>10) goto next else goto start". As shown, the reformulated code block in Table 2 starts by duplicating the code statements between the header of the SEIFL in Table 1 and the loop exit statement of the SEIFL in Table 1, and then by duplicating the loop exit statement of the SEIFL in Table 1.

Next, a label "start" is added to define the header for the TWFL. The loop body of the TWFL is formed by duplicating the code statements between the loop exit statement of the SEIFL in Table 1 and the end of the SEIFL in Table 1, and then by duplicating the code statements between the header of the SEIFL in Table 1 and the loop exit statement of the SEIFL in Table 1. Thus, the formed loop body for the TWFL is listed as below:

c[i]=d[i];
a[i]=b[i];
i=i+1;
e[i]=f[i];

where the statement of "i=i+1" is the loop index computational statement that contains an index variable "i" and a step value of "1".

A conditional loop termination statement "if (i>10) goto next else goto start" is added to define the end of the TWFL. The conditional loop termination statement is formed by duplicating the loop exit statement of the SEFIL in Table 1 and by adding a branch statement "else goto start". Thus, the conditional loop termination statement contains a loop termination condition "i>10" that is identical to the loop exit condition of the loop exit statement of the SEIFL in Table 1. If the loop termination condition of the conditional loop termination statement of the TWFL is verified to be false, the branch statement of the conditional loop termination statement will jump back to the label "start" to continue the loop operation of the TWFL.

Finally, a properly indexed format can be generated for the TWFL. For a well-formed loop, if its loop index computational statement is the last statement of the loop body, this well-formed loop has a properly indexed format. Thus, the loop index computational statement of "i=i+1" in the loop body of the TWFL needs to be moved to be the last statement of the loop body of the TWFL. The index variable "i", contained in the code statement "e[i]=f[i]", originally located between the loop index computational statement and the conditional loop termination statement of the TWFL, is increased by the step value of the loop index computational statement of the TWFL.

After the properly indexed format is generated for the loop body of the TWFL, the loop body of the TWFL of the reformulated code block for the SEIFL in Table 1 is listed below:

c[i]=d[i];
a[i]=b[i];
e[i+1]=f[i+1];
i=i+1;

Table 2 shows the reformulated code block for the SEIFL in Table 1 with a properly indexed format.

TABLE 2

```
i = 0;
a[i] = b[i];             /* beginning of the reformulated code block*/
i = i + 1;
e[i] = f[i];
if ( i >10 ) goto next;
start:                   /* header of the TWFL */
  c[i] = d[i];
  a[i] = b[i];
  e[i+1] = f[i+1];
  i = i + 1;             /* loop index computational statement */
  if ( i >10 ) goto next /* conditional loop termination statement */
  else goto start;       /* end of the TWFL and the reformulated code block*/
next:
```

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include computer readable storage medium, such as hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

The foregoing descriptions of specific embodiments of the invention have been presented for purposes of illustration and description. They are not intended to be exhaustive or to limit the invention to the precise forms disclosed. Obviously, many modifications and variations are possible in light of the above teaching. The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A computer-implemented method for loop reformulation executed by a processor of a computer system, comprising:
   providing a single exit ill-formed loop (SEIFL), the SEIFL including,
      a header being defined as a beginning of the SEIFL,
      an end being defined as an ending of the SEIFL,
      a loop body being defined as code statements between the header and the end of the SEIFL, wherein the loop body of the SEIFL includes a loop exit statement, the loop exit statement includes a loop exit condition such that the SEIFL will exit from the loop body of the SEIFL when the loop exit condition of the loop exit statement is verified to be true;
   reformulating the SEIFL into a reformulated code block, wherein the reformulated code block includes a transformed well-formed loop (TWFL) such that the TWFL exits from an end of the TWFL, wherein the reformulation ensures that a loop index computational statement is a last statement of the loop body of the TWFL,
   wherein the reformulating the SEIFL into a reformulated code block includes,
      duplicating code statements between the header of the SEIFL and the loop exit statement of the SEIFL;
      duplicating the loop exit statement of the SEIFL;
      forming a label to define a header of the TWFL;
      forming a loop body of the TWFL by duplicating code statements between the loop exit statement of the SEIFL and the end of the SEIFL, then by duplicating code statements between the header of the SEIFL and the loop exit statement of the SEIFL; and
      forming a conditional loop termination statement to define the end of the TWFL such that TWFL will either continue or terminate a loop operation of the TWFL depending upon a verification result of a loop termination condition contained in the conditional loop termination statement.

2. The method for loop reformulation as recited in claim 1, wherein the reformulating of the SEIFL into the reformulated code block further includes,
   generating a properly indexed format for the loop body of the TWFL.

3. The method for loop reformulation as recited in claim 2, wherein the generating of the properly indexed format for the loop body of the TWFL includes,
   identifying the loop index computational statement from the loop body of the TWFL, the loop index computational statement including an index variable and a step value;
   detecting whether the loop index computational statement is a last statement of the loop body of the TWFL;
   if the loop index computational statement fails to be the last statement of the loop body of the TWFL, then the generating of the properly indexed format for the loop body of the TWFL further includes,
      identifying code statements between the loop index computational statement and the conditional loop termination statement as a statement block; and
      increasing or decreasing each index variable of each code statement of the statement block by the step value of the loop index computational statement, and moving the loop index computational statement to be the last statement of the loop body of the TWFL.

4. The method for loop reformulation as recited in claim 1, wherein the conditional loop termination statement of the TWFL is formed by,
   duplicating the loop exit statement of the SEIFL such that the loop termination condition of the conditional loop termination statement of the TWFL is identical to the loop exit condition of the loop exit statement of the SEIFL; and
   adding a branch statement such that when the loop termination condition of the conditional loop termination statement of the TWFL is verified to be false, the branch statement will jump back to the label of the TWFL to continue the loop operation of the TWFL.

5. The method for loop reformulation as recited in claim 1, wherein the label of the TWFL is formed by a plurality of characters.

6. A computer readable storage medium having program instructions which when executed by a computer system enables loop reformulation, comprising:
   program instructions for detecting a single exit ill-formed loop (SEIFL), the SEIFL including,
      a header being defined as a beginning of the SEIFL;
      an end being defined as an ending of the SEIFL;
      a loop body being defined as code statements between the header and the end of the SEIFL,
      wherein the loop body of the SEIFL includes a loop exit statement, the loop exit statement includes a loop exit condition such that the SEIFL will exit from the loop body of the SEIFL when the loop exit condition of the loop exit statement is verified to be true; and program instructions for reformulating the SEIFL into a reformulated code block, wherein the reformulated code block includes a transformed well-formed loop (TWFL) such that the TWFL exits from an end of the TWFL, wherein the program instructions for reformulation ensures that a loop index computational statement is a last statement of the loop body of the TWFL, wherein the program instructions for reformulating the SEIFL further includes,
   program instructions for duplicating code statements between the header of the SEIFL and the loop exit statement of the SEIFL;
   program instructions for duplicating the loop exit statement of the SEIFL;
   program instructions for forming a label to define a header of the TWFL;
   program instructions for forming a loop body of the TWFL by duplicating code statements between the loop exit statement of the SEIFL and the end of the SEIFL, then by duplicating code statements between the header of the SEIFL and the loop exit statement of the SEIFL; and program instructions for forming a conditional loop termination statement to define the end of the TWFL such that TWFL will either continue or terminate loop operation of the TWFL depending upon a verification result of a loop termination condition contained in the conditional loop termination statement.

7. The computer readable storage medium having program instructions for loop reformulation as recited in claim 6, wherein the program instructions for reformulating the SEIFL further includes, program instructions for generating a properly indexed format for the loop body of the TWFL.

8. The computer readable storage medium having program instructions for loop reformulation as recited in claim 7, wherein the program instructions for generating the properly indexed format for the loop body of the TWFL includes, program instructions for identifying the loop index computational statement from the loop body of the TWFL, the loop index computational statement including an index variable and a step value;

program instructions for detecting whether the loop index computational statement is a last statement of the loop body of the TWFL;

if the loop index computational statement fails to be the last statement of the loop body of the TWFL, the program instructions for generating the properly indexed format for the loop body of the TWFL further includes, program instructions for identifying code statements between the loop index computational statement and the conditional loop termination statement as a statement block; and program instructions for increasing or decreasing each index variable of each code statement of the statement block by the step value of the loop index computational statement, and moving the loop index computational statement to be the last statement of the loop body of the TWFL.

9. The computer readable storage medium having program instructions for loop reformulation as recited in claim 6, wherein the program instructions for forming the conditional loop termination statement to define the end of the TWFL includes, program instructions for duplicating the loop exit statement of the SEIFL such that the loop termination condition of the conditional loop termination statement of the TWFL is identical to the loop exit condition of the loop exit statement of the SEIFL; and program instructions for adding a branch statement such that when the loop termination condition of the conditional loop termination statement of the TWFL is verified to be false, the branch statement will jump back to the label of the TWFL to continue the loop operation of the TWFL.

10. The computer readable storage medium having program instructions for loop reformulation as recited in claim 6, wherein the label of the TWFL is formed by a plurality of characters.

11. A method for computer program transformation, comprising:

providing a program source code;

producing a compiler's internal representation (IR) from the program source code;

detecting whether any single exit ill-formed loops (SEIFL) exist in the compiler's IR, wherein each of the SEIFLs is formed by a header, a loop body, and an end, the loop body of each of the SEIFLs contains a loop exit statement, each of the SEIFLs is capable of exiting from the loop body of each of the SEIFLs;

if the SEIFLs exist in the compiler's IR, reformulating each of the SEIFLs into each of corresponding reformulated code blocks, each of the corresponding reformulated code blocks containing a transformed well-formed loop (TWFL) such that the TWFL exits from an end of the TWFL, wherein the reformulation ensures that a loop index computation statement is a last statement of the loop body of the TWFL;

replacing each of the SEIFLs in the compiler's IR with each of the corresponding reformulated code blocks;

generating compiled program machine code from the compiler's IR having the reformulated code blocks, wherein each of the corresponding reformulated code blocks is formed by, duplicating code statements between the header of each of the SEIFLs and the loop exit statement of each of the SEIFLs;

duplicating the loop exit statement of each of the SEIFLs;

forming a label to define a header of the TWFL;

forming a loop body of the TWFL by duplicating code statements between the loop exit statement of each of the SEIFLs and the end of each of the SEIFLs, then by duplicating code statements between the header of each of the SEIFLs and the loop exit statement of each of the SEIFLs; and forming a conditional loop termination statement to define an end of the TWFL such that TWFL will either continue or terminate loop operation of the TWFL depending on a verification result of a loop termination condition contained in the conditional loop termination statement.

12. The method for computer program transformation as recited in claim 11, further comprising:

optimizing the compiler's IR before the generating of the program machine code.

13. The method for computer program transformation as recited in claim 11, wherein the reformulating of each of the SEIFLs starts from beginning of each program procedure that contains SEIFLs.

14. The method for computer program transformation as recited in claim 11, wherein each of the corresponding reformulated code blocks is further formed by generating a properly indexed format for the loop body of the TWFL.

15. The method for computer program transformation as recited in claim 14, wherein the generating of the properly indexed format for the loop body of the TWFL includes, identifying the loop index computational statement from the loop body of the TWFL, the loop index computational statement including an index variable and a step value;

detecting whether the loop index computational statement is last statement of the loop body of the TWFL;

if the loop index computational statement fails to be the last statement of the loop body of the TWFL, then the generating of the properly indexed format for the loop body of the TWFL further includes, identifying code statements between the loop index computational statement and the conditional loop termination statement of the TWFL as a statement block; and increasing or decreasing each index variable of each code statement of the statement block by the step value of the loop index computational statement, and moving the loop index computational statement to be the last statement of the loop body of the TWFL.

16. The method for computer program transformation as recited in claim 11, wherein the conditional loop termination statement is formed by, duplicating the loop exit statement of each of the SEIFLs such that the loop termination condition of the conditional loop termination statement of the TWFL is identical to the loop exit condition of the loop exit statement of each of the SEIFLs; and adding a branch statement such that when the loop termination condition of the conditional loop termination statement of the TWFL is verified to be false, the branch statement will jump back to the label of the TWFL to continue the loop operation of the TWFL.

* * * * *